United States Patent
Takahashi et al.

(10) Patent No.: US 12,550,147 B2
(45) Date of Patent: Feb. 10, 2026

(54) TERMINAL

(71) Applicant: NTT DOCOMO, INC., Tokyo (JP)

(72) Inventors: Yuki Takahashi, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 355 days.

(21) Appl. No.: 18/251,121

(22) PCT Filed: Nov. 11, 2021

(86) PCT No.: PCT/JP2021/041592
§ 371 (c)(1),
(2) Date: Apr. 28, 2023

(87) PCT Pub. No.: WO2022/102718
PCT Pub. Date: May 19, 2022

(65) Prior Publication Data
US 2023/0397214 A1 Dec. 7, 2023

(30) Foreign Application Priority Data
Nov. 11, 2020 (JP) ................................. 2020-187738

(51) Int. Cl.
*H04W 72/21* (2023.01)
*H04W 72/02* (2009.01)

(52) U.S. Cl.
CPC ........... *H04W 72/21* (2023.01); *H04W 72/02* (2013.01)

(58) Field of Classification Search
CPC ...... H04W 72/21; H04W 72/02; H04W 72/56
See application file for complete search history.

(56) References Cited

U.S. PATENT DOCUMENTS

| 9,485,060 B2 * | 11/2016 | Nayeb Nazar .... H04W 72/0446 |
| 11,870,587 B2 * | 1/2024 | Yang ...................... H04W 72/21 |
| 2011/0243066 A1 * | 10/2011 | Nayeb Nazar ........ H04L 5/0055 370/328 |
| 2016/0183244 A1 | 6/2016 | Papasakellariou |

(Continued)

FOREIGN PATENT DOCUMENTS

| WO | WO-2021067890 A1 * | 4/2021 | ............ H04W 72/53 |
| WO | WO-2021072160 A1 * | 4/2021 | ............ H04W 72/51 |
| WO | WO-2022074842 A1 * | 4/2022 | ............ H04W 72/12 |

OTHER PUBLICATIONS

International Search Report issued in corresponding International Application No. PCT/JP2021/041592, mailed on Dec. 28, 2021 (5 pages).

(Continued)

*Primary Examiner* — Jay P Patel
(74) *Attorney, Agent, or Firm* — Osha Bergman Watanabe & Burton LLP

(57) ABSTRACT

A terminal comprises: a control unit that multiplexes two or more uplink control information having mutually different priorities on an uplink control channel; and a communication unit that transmits an uplink signal using the uplink control channel on which the two or more uplink control information are multiplexed; wherein the control unit determines a number of resource blocks related to the uplink control channel in a separate coding of the two or more uplink control information.

5 Claims, 6 Drawing Sheets

(56) References Cited

U.S. PATENT DOCUMENTS

| | | | |
|---|---|---|---|
| 2018/0091267 A1* | 3/2018 | Kim | H04L 5/001 |
| 2019/0215826 A1 | 7/2019 | Baldemair et al. | |
| 2020/0007296 A1* | 1/2020 | Papasakellariou | H04L 1/1861 |
| 2021/0219268 A1* | 7/2021 | Li | H04B 17/318 |
| 2022/0167266 A1* | 5/2022 | Nimbalker | H04W 72/20 |
| 2022/0256568 A1* | 8/2022 | Choe | H04W 56/0045 |
| 2022/0264447 A1* | 8/2022 | Byun | H04W 52/0235 |
| 2023/0006776 A1* | 1/2023 | Yang | H04L 1/00 |
| 2023/0155739 A1* | 5/2023 | Yang | H04L 5/00 370/329 |

OTHER PUBLICATIONS

Written Opinion issued in corresponding International Application No. PCT/JP2021/041592, mailed on Dec. 28, 2021 (4 pages).

Nokia et al; "On UL intra-UE prioritization and multiplexing enhancements"; 3GPP TSG RAN WG1 #103-e, R1-2008843; e-Meeting; Oct. 26-Nov. 13, 2020 (21 pages).

Nokia et al; "Revised WID: Enhanced Industrial Internet of Things (IoT) and ultra-reliable and low latency communication (URLLC) support for NR"; 3GPP TSG RAN Meeting #88e, RP-201310; Electronic meeting; Jun. 29-Jul. 3, 2020 (6 pages).

* cited by examiner

TERMINAL

TECHNICAL FIELD

The present disclosure relates to terminals that perform radio communication, particularly terminals that perform multiplexing of uplink control information for uplink control channels.

BACKGROUND ART

The 3rd Generation Partnership Project (3GPP) specifies 5th generation mobile communication system (5G, also called New Radio (NR) or Next Generation (NG), further, a succeeding system called Beyond 5G, 5G Evolution or 6G is being specified.

Release 15 of 3 GPP supports multiplexing of two or more uplink channels (PUCCH (Physical Uplink Control Channel) and PUSCH (Physical Uplink Shared Channel)) transmitted in the same slot.

In addition, 3 GPP Release 17 agreed to support the multiplexing of UCIs with different priorities into PUCCHs (For example, Non-Patent Literature 1).

CITATION LIST

Non-Patent Literature

Non-Patent Literature 1 "Enhanced Industrial Internet of Things (IoT) and ultra-reliable and low latency communication", RP-201310, 3 GPP TSG RAN Meeting #86 e, 3 GPP, July 2020

SUMMARY OF INVENTION

Against such a background, the inventors have found that it is possible to appropriately execute the channel coding of UCIs having different priorities by introducing a new scaling factor to be used for the channel coding in the multiplexing of different UCIs.

Accordingly, the following disclosure has been made in view of such a situation, and it is an object of the present invention to provide a terminal capable of appropriately performing channel coding of uplink control information multiplexed on the uplink control channel.

An aspect of the present disclosure is a terminal comprising: a control unit that multiplexes two or more uplink control information having mutually different priorities on an uplink control channel; and a communication unit that transmits an uplink signal using the uplink control channel on which the two or more uplink control information are multiplexed; wherein the control unit determines a number of resource blocks related to the uplink control channel in a separate coding of the two or more uplink control information.

DESCRIPTION OF EMBODIMENTS

Figure 1:
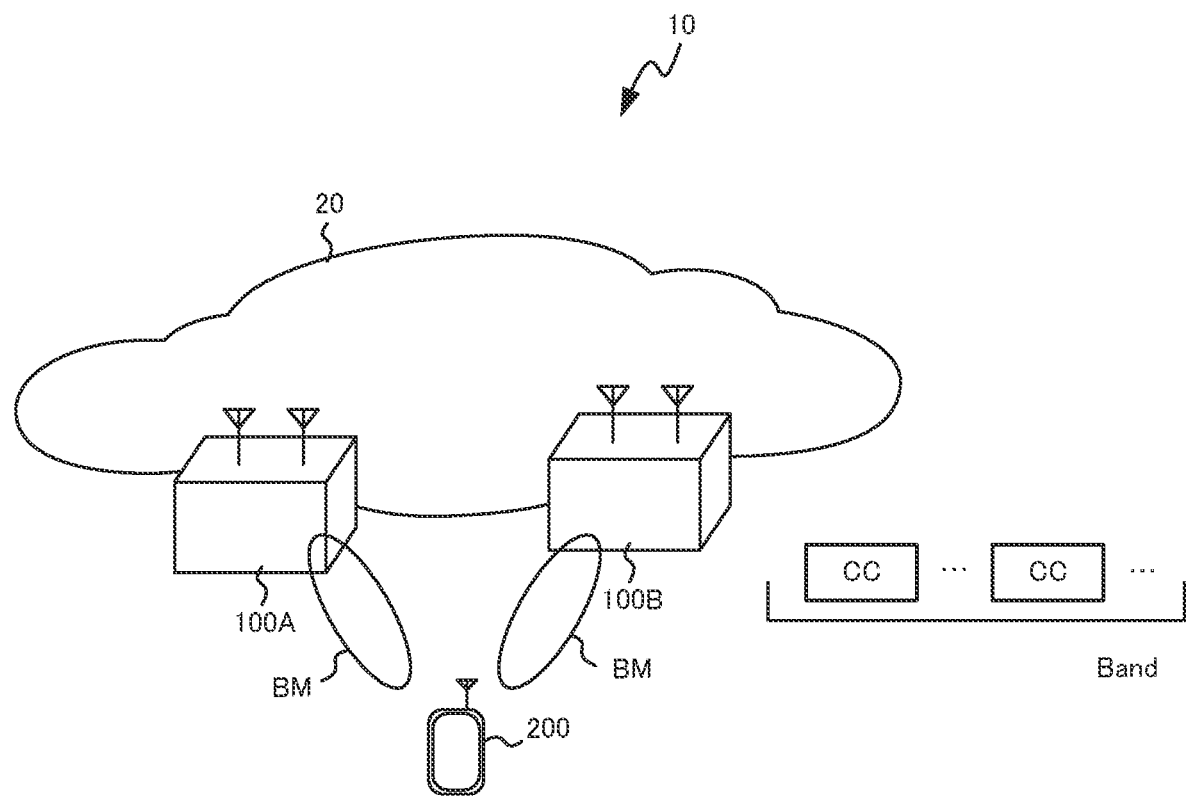
FIG. 1 is an overall schematic diagram of a radio communication system 10.

Exemplary embodiments of the present invention are explained below with reference to the accompanying drawings. Note that, the same or similar reference numerals have been attached to the same functions and configurations, and the description thereof is appropriately omitted.

Embodiments (1) Overall Schematic Configuration of the Radio Communication System FIG. 1 is an overall schematic configuration diagram of a radio communication system 10 according to an embodiment. radio communication system 10 is a 5G New Radio (NR) compliant radio communication system and includes a Next Generation-Radio Access Network 20 (hereinafter NG-RAN 20), and a terminal 200 (Below, UE 200).

The radio communication system 10 may be a radio communication system that follows a scheme called Beyond 5G, 5G Evolution or 6 G.

The NG-RAN 20 includes a radio base station 100 A (gNB 100 A) and a radio base station 100 B (gNB 100 B). The specific configuration of radio communication system 10 including the number of gNBs and UEs is not limited to the example shown in FIG. 1.

The NG-RAN 20 actually includes a plurality of NG-RAN Nodes, specifically gNBs (or ng-eNBs), and is connected to a core network (5 GC, not shown) according to 5G. Note that the NG-RAN 20 and 5 GC may be expressed simply as a "network".

The gNB 100 A and the gNB 100 B are radio base stations according to 5G, and execute radio communication according to the UE 200 and 5G. By controlling radio signals transmitted from a plurality of antenna elements, the gNB 100 A, the gNB 100 B, and the UE 200 can support Massive MIMO (Multiple-Input Multiple-Output) for generating a beam BM having a higher directivity, carrier aggregation (CA) for bundling a plurality of component carriers (CC), and dual connectivity (DC) for simultaneously communicating between the UE and each of the two NG-RAN nodes. The DC may include MR-DC (Multi-RAT Dual Connectivity) using MCG (Master Cell Group) and SCG (Secondary Cell Group). Examples of MR-DC include EN-DC (E-UTRA-NR Dual Connectivity), NE-DC (NR-EUTRA Dual Connectivity), and NR-DC (NR-NR Dual Connectivity). Here, CC (cell) used in CA may be considered to constitute the same cell group. MCG and SCG may be considered to constitute the same cell group.

Figure 2:
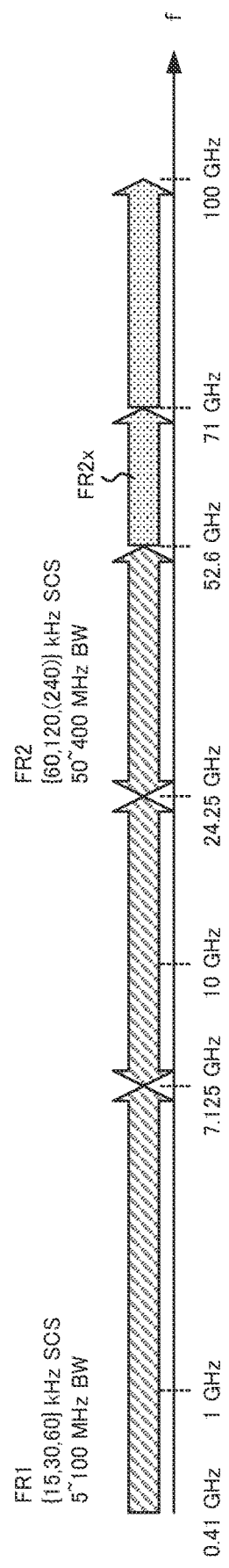
FIG. 2 is a diagram illustrating the frequency range used in radio communication system 10.

The radio communication system 10 corresponds to a plurality of frequency ranges (FR). FIG. 2 shows the frequency range used in radio communication system 10.

As shown in FIG. 2, the radio communication system 10 corresponds to FR1 and FR2. The frequency bands of each FR are as follows.

FR 1: 410 MHz to 7.125 GHz

FR 2: 24.25 GHz to 52.6 GHz

In FR 1, 15, 30 or 60 kHz Sub-Carrier Spacing (SCS) may be used and a 5~100 MHz bandwidth (BW) may be used. FR 2 is a higher frequency than FR 1, and an SCS of 60 or 120 kHz (240 kHz may be included) may be used, and a bandwidth (BW) of 50~400 MHz may be used.

The SCS may be interpreted as numerology. Numerology is defined in 3 GPP TS 38.300 and corresponds to one subcarrier interval in the frequency domain.

Furthermore, the radio communication system 10 also supports higher frequency bands than the FR 2 frequency band. Specifically, the radio communication system 10 supports the frequency band above 52.6 GHz up to 114.25 GHz. Such a high frequency band may be referred to as "FR2x" for convenience.

In order to solve the problem that the influence of phase noise becomes large in the high frequency band, cyclic prefix-orthogonal frequency division multiplexing (CP-OFDM)/discrete Fourier transform-spread (DFT-S-OFDM) with larger sub-carrier spacing (SCS) may be applied when using the band above 52.6 GHz.

Figure 3:
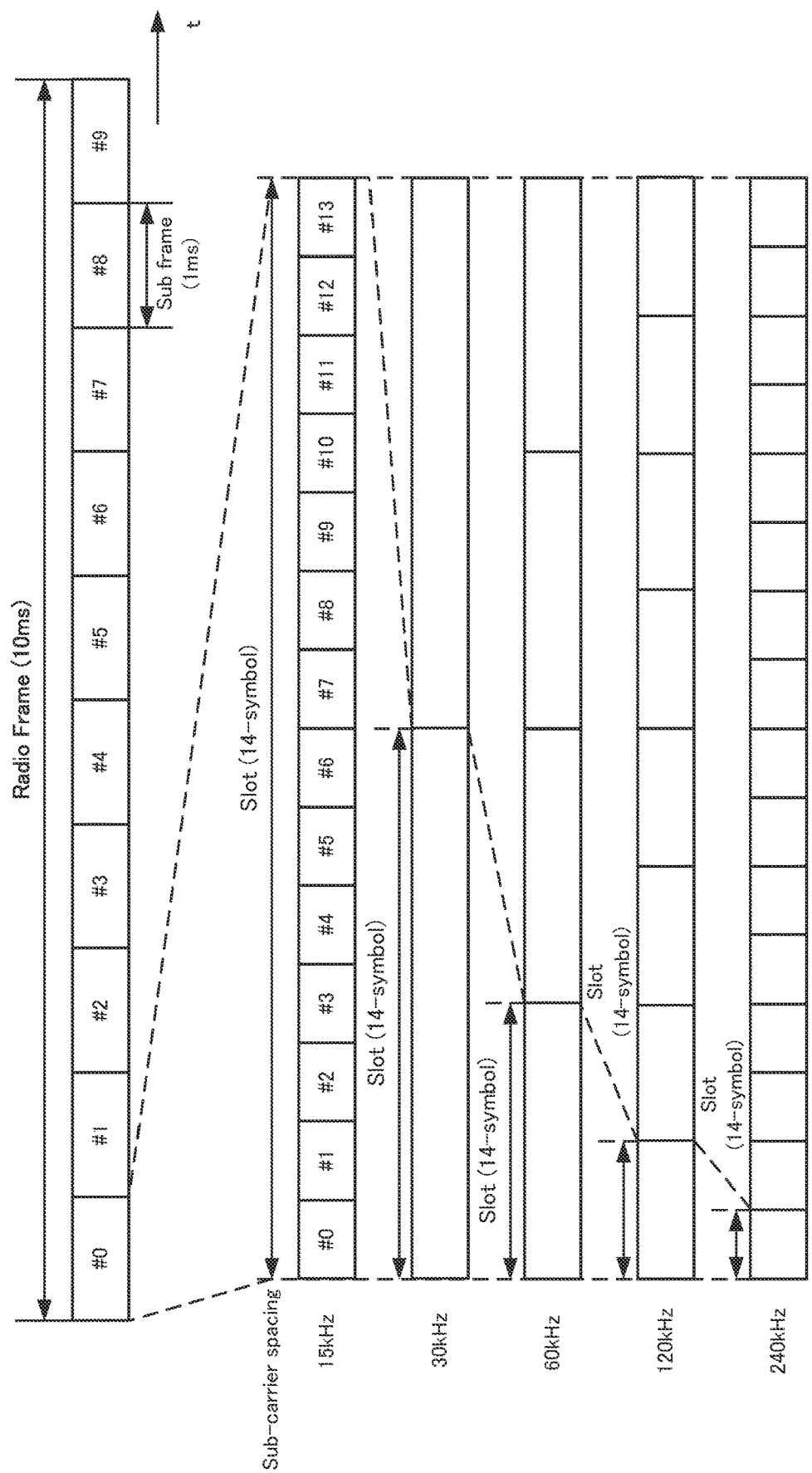
FIG. 3 shows an exemplary configuration of a radio frame, subframe, and slot used in a radio communication system 10.

FIG. 3 shows a configuration example of a radio frame, a sub-frame and a slot used in radio communication system 10.

As shown in FIG. 3, one slot comprises 14 symbols, and the larger (wider) the SCS, the shorter the symbol period (and the slot period). The SCS is not limited to the spacing (frequency) shown in FIG. 3. For example, 480 kHz, 960 kHz, and the like may be used.

The number of symbols constituting 1 slot is not necessarily 14 (For example, 28, 56 symbols). Furthermore, the number of slots per subframe may vary depending on the SCS.

The time direction (t) shown in FIG. 3 may be referred to as a time region, a symbol period or a symbol time. The frequency direction may be referred to as a frequency domain, a resource block, a subcarrier, a BWP (Bandwidth Part), or the like.

(2) Function Block Configuration of Radio Communication System

Next, the functional block configuration of radio communication system 10 will be described. Specifically, the functional block configuration of the UE 200 will be described.

Figure 4:
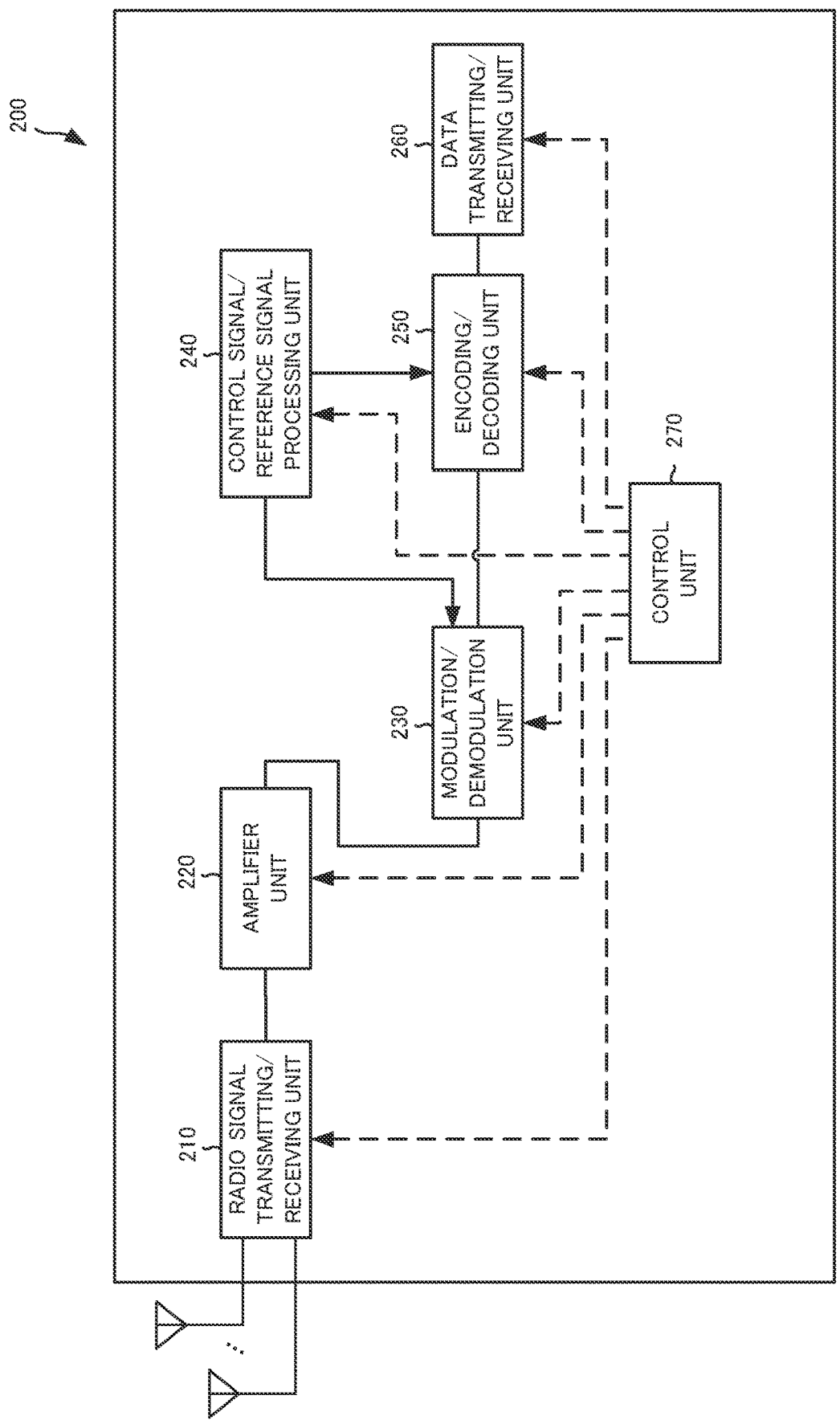
FIG. 4 is a functional block diagram of the UE 200.

FIG. 4 is a functional block diagram of the UE 200. As shown in FIG. 4, the UE 200 includes a radio signal transmission/reception unit 210, an amplifier unit 220, a modulation/demodulation unit 230, a control signal/reference signal processing unit 240, an encoding/decoding unit 250, a data transmission/reception unit 260 and a control unit 270.

The radio signal transmission/reception unit 210 transmits and receives radio signals in accordance with NR. The radio signal transmission/reception unit 210 supports Massive MIMO, CA with multiple CCs bundled together, and DC with simultaneous communication between the UE and each of the two NG-RAN Nodes.

The amplifier unit 220 is composed of a PA (Power Amplifier)/LNA (Low Noise Amplifier) and the like. The amplifier unit 220 amplifies the signal output from modulation/demodulation unit 230 to a predetermined power level. The amplifier unit 220 also amplifies the RF signal output from radio signal transmission/reception unit 210.

The modulation/demodulation unit 230 performs data modulation/demodulation, transmission power setting, resource block allocation and the like for each predetermined communication destination (gNB 100 or other gNB). In modulation/demodulation unit 230, Cyclic Prefix-Orthogonal Frequency Division Multiplexing (CP-OFDM)/Discrete Fourier Transform-Spread (DFT-S-OFDM) may be applied. The DFT-S-OFDM may be used not only in the uplink (UL) but also in the downlink (DL).

The control signal/reference signal processing unit 240 executes processing relating to various control signals transmitted and received by the UE 200 and processing relating to various reference signals transmitted and received by the UE 200.

Specifically, the control signal/reference signal processing unit 240 receives various control signals transmitted from the gNB 100 via a predetermined control channel, for example, a control signal of the radio resource control layer (RRC). The control signal/reference signal processing unit 240 transmits various control signals to the gNB 100 through a predetermined control channel.

The control signal/reference signal processing unit 240 performs processing using reference signals (RS) such as the Demodulation Reference Signal (DMRS) and the Phase Tracking Reference Signal (PTRS).

The DMRS is a reference signal (pilot signal) known between a base station and a terminal of each terminal for estimating a fading channel used for data demodulation. The PTRS is a reference signal for each terminal for the purpose of estimating phase noise which becomes a problem in a high frequency band.

In addition to DMRS and PTRS, the reference signal may include a Channel State Information-Reference Signal (CSI-RS), a Sounding Reference Signal (SRS), and a Positioning Reference Signal (PRS) for position information.

The channel includes a control channel and a data channel. The control channel includes PDCCH (Physical Downlink Control Channel), PUCCH (Physical Uplink Control Channel), RACH (Random Access Channel), Downlink Control Information (DCI) including a Random Access Radio Network Temporary Identifier (RA-RNTI), and a Physical Broadcast Channel (PBCH).

The data channels include PDSCH (Physical Downlink Shared Channel) and PUSCH (Physical Uplink Shared Channel). Data means data transmitted over a data channel. The data channel may be read as a shared channel.

In the embodiment, the control signal/reference signal processing unit 240 constitutes a communication unit for transmitting an uplink signal by using an uplink control channel (PUCCH) in which two or more uplink control information (UCI (Uplink Control Information)) having different priorities are multiplexed. The uplink signal transmitted through the PUCCH includes at least a UCI. The UCI may include an acknowledgment (HARQ-ACK) for one or more TBs. The UCI may include a Scheduling Request (SR) requesting the scheduling of a resource and may include a Channel State Information (CSI) representing the state of the channel.

The encoding/decoding unit 250 executes data division/connection, channel coding/decoding and the like for each predetermined communication destination (gNB 100 or other gNB).

Specifically, the encoding/decoding unit 250 divides the data output from data transmission/reception unit 260 into predetermined sizes, and executes channel coding on the divided data. The encoding/decoding unit 250 decodes the data output from modulation/demodulation unit 230 and connects the decoded data.

The data transmission/reception unit 260 sends and receives protocol data units (PDU) and service data units (SDU). Specifically, data transmission/reception unit 260 performs assembly/disassembly of PDUs/SDUs in a plurality of layers (Media access control layer (MAC), wireless link controllayer (RLC), and packet data convergence protocol layer (PDCP), etc.). The data transmission/reception unit 260 executes err or correction and retransmission control of the data based on the hybrid automatic repeat request (ARQ).

The control unit 270 controls each functional block constituting the UE 200. In particular, in embodiments, the control unit 270 constitutes a control unit that multiplexes the PUCCHs with two or more UCIs having different priorities. The control unit 270 applies a specific scaling factor to at least one of two or more UCIs in channel coding of the two or more UCIs. The specific scaling factor may be referred to as omega_LP_HP, omega_HP or omega_LP. The specific scaling factor is a parameter used in the case of separately determining code rates of two or more UCIs having different priorities.

In the following description, UCI (hereinafter, LP (Low Priority) UCI) having a first priority and UCI (HP (High Priority) UCI) having a second priority higher than the first priority are taken as examples. omega_LP_HP may be a parameter applied to the LP UCI or a parameter applied to the HP UCI. The specific scaling factor satisfies a condition of 0≤omega_LP_HP (omega_HP or omega_LP)≤1.

(3) Channel Coding

Channel coding will be described below. Specifically, the channel coding of the UCI in the case where different UCIs are multiplexed to the PUCCH will be described. Here, a case in which LP UCI and HP UCI are multiplexed will be exemplified. The UCI may be one or more information elements selected from HARQ-ACK, SR, CSI Unit 1, and CSI Unit 2.

(3.1) Applicable Example 1

Application example 1 will be described below. In application example 1, a specific scaling factor (omega_LP_HP) applied to either one of LP UCI and HP UCI will be described. This applies to omega_LP_HP for LP UCI.

The code rate of the HP UCI (HP_UCI_coding_rate) may be a code rate applied to the HP UCI or a code rate applied to the HP (High Priority) PUCCH resource. These code rates are the code rates before omega_LP_HP is multiplied, and may be the original coding rate used in the case where UCIs having different priorities are not multiplexed.

The LP UCI coding rate may be a code rate obtained by multiplying the HP_UCI_coding_rate by omega_LP_HP.

(3.2) Applicable Example 2

Application example 2 will be described below. In application example 2, a specific scaling factor (omega_LP_HP) applied to either one of LP UCI and HP UCI will be described. This applies to the HP UCI and omega_LP_HP.

The HP UCI coding rate may be a code rate obtained by dividing the LP_UCI_coding_rate by omega_LP_HP. In other words, HP_UCI_coding_rate may be a code rate obtained by multiplying LP_UCI_coding_rate by the inverse of omega_LP_HP.

The LP UCI code rate (LP_UCI_coding_rate) may be a code rate applied to the LP UCI or a code rate applied to the LP (Low Priority) PUCCH resource. These code rates are the code rates before omega_LP_HP is multiplied, and may be the original coding rate used in the case where UCIs having different priorities are not multiplexed.

(3.3) Applicable Example 3

Application example 3 will be described below. In application example 3, a specific scaling factor (omega_LP_HP) applied to either one of LP UCI and HP UCI will be described. In the application example 3, a case where the PUCCH format is any one of PUCCH Format 2, PUCCH Format 3 and PUCCH Format 4 will be described. Application example 3 describes a case where the LP_UCI_coding_rate can be changed without changing the HP_UCI_coding_rate.

The code rate of the HP UCI (HP_UCI_coding_rate) may be a code rate applied to the HP UCI or a code rate applied to the HP (High Priority) PUCCH resource. These code rates are the code rates before omega_LP_HP is multiplied and may be referred to as the original coding rate.

The LP UCI coding rate may be represented by LP_UCI_coding_rate=min (omega_LP_HP*HP_UCI_coding_rate, Upper_bound_LP_UCI_coding_rate).

The upper_bound_LP_UCI_coding_rate represents the upper limit of the LP UCI's coding rate and is calculated based on the total number of REs (Resource Elements) of the PUCCH resource to which the LP_UCI is multiplexed, HP_UCI_coding_rate, HP UCI payload, and LP UCI payload. The LP UCI payload may be a payload in which the LP UCI bits are not banded or partially dropped, or a payload in which the LP UCI bits are banded or partially dropped.

(3.4) Applicable Example 4

Application example 4 will be described below. In application example 4, a specific scaling factor (omega_LP_HP) applied to either one of LP UCI and HP UCI will be described. Here, a case where the PUCCH format is any one of PUCCH Format 2, PUCCH Format 3 and PUCCH Format 4 will be described. Application example 4 describes a case where both LP_UCI_coding_rate and HP_UCI_coding_rate can be changed.

The HP UCI coding rate and the LP UCI coding rate may be calculated based on the total number of REs, the HP UCI payload and the LP UCI payload of the PUCCH resource to which the LP UCI and HP UCI are multiplexed. The LP UCI payload may be a payload in which the LP UCI bits are not banded or partially dropped, or a payload in which the LP UCI bits are banded or partially dropped.

However, a constraint condition that LP_UCI_coding_rate is a code rate obtained by multiplying HP_UCI_coding_rate by omega_LP_HP may be imposed.

(3.5) Applicable Example 5

Application example 5 will be described below. In Application Example 5, a case where a specific scaling factor (omega_LP) applied to the LP UCI and a specific scaling factor (omega_HP) applied to the HP UCI are defined separately will be described. In the fifth application example, the omega_HP is provided without the omega_LP being provided.

The HP UCI code rate (HP_UCI_coding_rate) may be a code rate obtained by multiplying the original coding rate by omega_HP. The original coding rate may be the code rate applied to the HP UCI or the code rate applied to the HP PUCCH resource.

The LP UCI coding rate may be represented by LP_UCI_coding_rate=min (HP_UCI_coding_rate, original coding rate). The original coding rate may be a code rate applied to the LP UCI or may be a code rate applied to the LP PUCCH resource.

(3.6) Applicable Example 6

Application example 6 will be described below. In the application example 6, a case where a specific scaling factor (omega_LP) applied to the LP UCI and a specific scaling factor (omega_HP) applied to the HP UCI are defined separately will be described. In the fifth application example, the omega_LP is provided without the omega_HP being provided.

The HP UCI coding rate may be a code rate applied to the HP UCI or a code rate applied to the HP PUCCH resource. These code rates may be referred to as original coding rates.

The LP UCI code rate (LP_UCI_coding_rate) may be a code rate obtained by multiplying the original coding rate by omega_LP. The original coding rate may be a code rate applied to the LP UCI or may be a code rate applied to the LP PUCCH resource.

However, a constraint condition that the LP_UCI_coding_rate is not larger than the HP_UCI_coding_rate may be provided.

(3.7) Applicable Example 7

Application example 7 will be described below. In the application example 7, a case where a specific scaling factor (omega_LP) applied to the LP UCI and a specific scaling factor (omega_HP) applied to the HP UCI are defined separately will be described. In the application example 7, both omega_LP and omega_HP are provided.

The HP UCI code rate (HP_UCI_coding_rate) may be a code rate obtained by multiplying the original coding rate by omega_HP. The original coding rate may be the code rate applied to the HP UCI or the code rate applied to the HP PUCCH resource.

The LP UCI code rate (LP_UCI_coding_rate) may be a code rate obtained by multiplying the original coding rate by omega_LP. The original coding rate may be a code rate applied to the LP UCI or may be a code rate applied to the LP PUCCH resource.

However, a constraint condition that the LP_UCI_coding_rate is not larger than the HP_UCI_coding_rate may be provided.

(3.8) Applicable Example 8

Application example 8 will be described below. In the application example 8, a case where a specific scaling factor (omega_LP) applied to the LP UCI and a specific scaling factor (omega_HP) applied to the HP UCI are defined separately will be described. Here, a case where the PUCCH format is any one of PUCCH Format 2, PUCCH Format 3 and PUCCH Format 4 will be described. In the application example 8, a case where omega_HP is provided without omega_LP is exemplified.

The HP UCI code rate (HP_UCI_coding_rate) may be a code rate obtained by multiplying the original coding rate by omega_HP. The original coding rate may be the code rate applied to the HP UCI or the code rate applied to the HP PUCCH resource.

The LP UCI coding rate may be represented by LP_UCI_coding_rate=min (Upper_bound_LP_UCI_coding_rate, HP_UCI_coding_rate, original coding rate).

The upper_bound_LP_UCI_coding_rate represents the upper limit of the LP UCI's coding rate and is calculated based on the total number of REs (Resource Elements) of the PUCCH resource to which the LP_UCI is multiplexed, HP_UCI_coding_rate, HP UCI payload, and LP UCI payload. The LP UCI payload may be a payload in which the LP UCI bits are not banded or partially dropped, or a payload in which the LP UCI bits are banded or partially dropped. The original coding rate may be a code rate applied to the LP UCI or may be a code rate applied to the LP PUCCH resource.

(3.9) Applicable Example 9

Application example 9 will be described below. In the application example 9, a case where a specific scaling factor (omega_LP) applied to the LP UCI and a specific scaling factor (omega_HP) applied to the HP UCI are defined separately will be described. Here, a case where the PUCCH format is any one of PUCCH Format 2, PUCCH Format 3 and PUCCH Format 4 will be described. In the application example 9, a case in which omega_LP is provided without omega_HP is exemplified.

The HP UCI coding rate may be a code rate applied to the HP UCI or a code rate applied to the HP PUCCH resource. These code rates may be referred to as original coding rates.

The LP UCI coding rate may be represented by LP_UCI_coding_rate=min (Upper_bound_LP_UCI_coding_rate, omega_LP*original coding rate).

The upper_bound_LP_UCI_coding_rate represents the upper limit of the LP UCI's coding rate and is calculated based on the total number of REs (Resource Elements) of the PUCCH resource to which the LP_UCI is multiplexed, HP_UCI_coding_rate, HP UCI payload, and LP UCI payload. The LP UCI payload may be a payload in which the LP UCI bits are not banded or partially dropped, or a payload in which the LP UCI bits are banded or partially dropped. The original coding rate may be a code rate applied to the LP UCI or may be a code rate applied to the LP PUCCH resource.

However, a constraint condition that the LP_UCI_coding_rate is not larger than the HP_UCI_coding_rate may be provided.

(3.10) Applicable Example 10

Application example 10 will be described below. Application example 10 describes a case in which a specific scaling factor (omega_LP) applied to the LP UCI and a specific scaling factor (omega_HP) applied to the HP UCI are separately defined. Here, a case where the PUCCH format is any one of PUCCH Format 2, PUCCH Format 3 and PUCCH Format 4 will be described. In the application example 10, both omega_LP and omega_HP are provided.

The HP UCI code rate (HP_UCI_coding_rate) may be a code rate obtained by multiplying the original coding rate by omega_HP. The original coding rate may be the code rate applied to the HP UCI or the code rate applied to the HP PUCCH resource.

The LP UCI coding rate may be represented by LP_UCI_coding_rate=min (Upper_bound_LP_UCI_coding_rate, omega_LP*original coding rate).

The upper_bound_LP_UCI_coding_rate represents the upper limit of the LP UCI's coding rate and is calculated based on the total number of REs (Resource Elements) of the PUCCH resource to which the LP_UCI is multiplexed, HP_UCI_coding_rate, HP UCI payload, and LP UCI payload. The LP UCI payload may be a payload in which the LP UCI bits are not banded or partially dropped, or a payload in which the LP UCI bits are banded or partially dropped. The original coding rate may be a code rate applied to the LP UCI or may be a code rate applied to the LP PUCCH resource.

However, a constraint condition that the LP_UCI_coding_rate is not larger than the HP_UCI_coding_rate may be provided.

(4) Notification Method

The method of notifying the specific scaling factor (omega_LP_HP, omega_HP, omega_LP) described above will be described below.

(4.1) Radio Resource Control Messages

The UE 200 may apply a specific scaling factor based on a radio resource control message (RRC message) that includes an information element that specifies the specific scaling factor.

First, the RRC message may include an information element that identifies the omega_LP_HP described above. omega_LP_HP is a parameter used in the above-described application example 1-4. The omega_LP_HP may be associated with UCIs having different priorities. For example, UCIs with different priorities may include LP HARQ-ACK and HP HARQ-ACK, and may include HP HARQ-ACK and LP CSI.

Here, omega_LP_HP which is commonly applied to UCIs having different priorities may be set regardless of the combination of HP UCI and LP UCI multiplexed to PUCCH. Separate omega_LP_HP may be set for each combination of HP UCI and LP UCI multiplexed in PUCCH. The combination of HP UCI and LP UCI may be referred to as a multiple case.

Second, the RRC message may include an information element that identifies the omega_HP described above. omega_HP is a parameter used in the above-described application examples 5, 7, 8, and 10. The omega_HP may be associated with a UCI (HP UCI) having a high priority. For example, HP UCI may include HP HARQ-ACK and may include HP SR.

Here, omega_HP which is commonly applied to UCIs having different priorities may be set regardless of the combination of HP UCI and LP UCI multiplexed to PUCCH. Separate omega_HP may be set for each combination of HP UCI and LP UCI multiplexed in PUCCH.

Third, the RRC message may include an information element that identifies the omega_LP described above. The omega_LP is a parameter used in the above-described application examples 6, 7, 9, and 10. The omega_LP may be associated with a low-priority UCI (LP UCI). For example, LP UCI may include LP HARQ-ACK and may include LP CSI.

Here, regardless of the combination of HP UCI and LP UCI multiplexed in PUCCH, omega_-LP that is commonly applied to UCIs having different priorities may be set. A separate omega_LP may be set for each combination of HP UCI and LP UCI multiplexed to PUCCH.

(4.2) Downlink Control Information

The UE 200 may apply a specific scaling factor based on downlink control information (DCI) including an information element that specifies the specific scaling factor. In such a case, setting of a possible value for a particular scaling factor may be performed by an RRC message. The DCI may include fields for storing information elements that explicitly specify the set set set by the RRC message.

First, a case where one DCI specifies a specific scaling factor to be applied to the multiplicity of one UCI will be described.

In such a case, a specific DCI format specific to the UE 200 may be used as the DCI format. The specific DCI format may include a DCI format that schedules PDSCH with HARQ-ACK and may include other DCI formats that schedule PUCCHs. In such a case, the DCI may have the following fields.

The DCI may include fields for storing information elements that identify the omega_LP_HP described above. omega_LP_HP is a parameter used in the above-described application example 1~4.

The DCI may include a field for storing an information element that specifies one of the omega_HP and omega_LP described above (omega_XP). omega_HP is a parameter used in the above-described application examples 5, 7, 8, and 10. The omega_LP is a parameter used in the above-described application examples 6, 7, 9, and 10. For example, omega_XP included in the DCI for the HP UCI may be interpreted as omega_HP. The omega_XP included in the DCI for the LP UCI may be interpreted as omega_LP.

The DCI may include a field for storing the information element for specifying the omega_HP described above and a field for storing the information element for specifying the omega_LP.

A field for storing an information element for specifying the omega_LP_HP described above and a field for storing an information element for specifying any one of the omega_HP and omega_LP described above (omega_XP) may be included. For example, a DCI for an HP UCI may include an information element that identifies omega_LP_HP and an information element that identifies omega_XP that is interpreted as omega_HP. The DCI for the LP UCI may include an information element that identifies omega_LP_HP and an information element that identifies omega_XP to be interpreted as omega_LP.

The DCI may include a field for storing the information element for specifying the omega_LP_HP, a field for storing the information element for specifying the omega_HP, and a field for storing the information element for specifying the omega_LP.

In these cases, if the DCI contains an information element that identifies omega_LP_HP, the following constraints may be imposed. Specifically, the constraint may include a condition that omega_LP_HP included in the DCI for the HP UCI must not differ from omega_LP_HP included in the DCI for the LP UCI. The constraint condition may include a condition that omega_LP_HP included in the DCI for the HP UCI is not applied. The constraint condition may include a condition that omega_LP_HP included in the DCI for the LP UCI is not applied.

In addition, the following constraints may be imposed if the DCI includes fields for storing information elements that identify both omega_HP and omega_LP. Specifically, the constraint may include a condition that omega_HP included in the DCI for the HP UCI must not differ from omega_LP included in the DCI for the LP UCI. The restriction condition may include a condition that omega_HP included in the DCI for the HP UCI is applied without applying omega_LP included in the DCI for the LP UCI. The constraint condition may include a condition that omega_LP included in DCI for LP UCI is applied without omega_HP included in DCI for HP UCI.

Second, a case where a single DCI specifies a specific scaling factor that is continuously applied to multiple UCIs within a specific time period will be described.

In such a case, a specific DCI format may be used as the DCI format. The specific DCI format may include a newly introduced DCI format, or may include an existing DCI format (0_0, 0_1, 0_2, 1_0, 1_1, 1_2) without data or PUCCH scheduling. Specific DCI formats commonly applied to a group may include an existing format (Group Common DCI Format) or may include a newly introduced DCI format. In such a case, the DCI may have the following fields.

The DCI may include fields for storing information elements that identify the omega_LP_HP described above. omega_LP_HP is a parameter used in the above-described application example 1~4.

The DCI may include fields for storing information elements that identify the omega_HP described above. omega_HP is a parameter used in the above-described application examples 5, 7, 8, and 10.

The DCI may include fields for storing information elements that identify the omega_LP described above. The omega_LP is a parameter used in the above-described application examples 6, 7, 9, and 10.

The DCI may include a field for storing the information element for specifying the omega_HP described above and a field for storing the information element for specifying the omega_LP described above.

The DCI may include a field for storing the information element for specifying the omega_LP_HP described above and a field for storing the information element for specifying the omega_HP described above.

The DCI may include a field for storing the information element for specifying the omega_LP_HP described above and a field for storing the information element for specifying the omega_LP described above.

The DCI may include a field for storing the information element for specifying the omega_LP_HP, a field for storing the information element for specifying the omega_HP, and a field for storing the information element for specifying the omega_LP.

In such a case, the information elements (specific scaling factors) contained in the DCI may be applied to all UCI multiplexes, regardless of the combination of HP UCI and LP UCI multiplexed in PUCCH.

The specific scaling factor may be applied to a multiple case set as a combination of HP UCI and LP UCI multiplexed to PUCCH (Hereinafter, multiple cases). The multiple case may be set by an RRC message. The DCI may include a field that stores a specific scaling factor that is different for each multiple case. The DCI may number the combinations of UCIs that apply a particular scaling factor. For example, omega_LP_HP_1 may be applied to a combination of LP HARQ-ACK and HP HARQ-ACK, and omega_LP_HP_2 may be applied to a combination of HP HARQ-ACK and LP HARQ-ACK. omegaHP_1 may be applied to HP HARQ-ACK and omega_HP_2 may be applied to HP SR. omega_LP_1 may be applied to LP HARQ-ACK, and omega_LP_2 may be applied to LP CSI.

The specific scaling factor may be applied to multiple cases specified by the DCI. Two or more multiple cases may be set by the RRC message and one of the set multiple cases may be specified by the DCI. As described above, the DCI may include fields that store specific scaling factors that are different for each multiple case. The DCI may number the combinations of UCIs that apply a particular scaling factor.

Further, a mechanism for deactivating the specific scaling factor may be introduced. For example, a timer may be introduced to measure the period during which a specific scaling factor is applied, and the specific scaling factor may be deactivated upon expiration of the timer. The timer may measure the period in units of symbols or in units of slots. Alternatively, a DCI may be introduced that includes an information element that indicates the inactivation of a particular scaling factor.

(5) Terminal Capability

The UE 200 may send a UE Capability to the NG-RAN 20 that includes an information element regarding the application of a particular scaling factor. In other words, UE 200 may apply a specific scaling factor based on the capabilities of UE 200. The information element for applying the specific scaling factor may be an information element indicating that the UE 200 supports multiplexing of UCIs with different priorities. The information element relating to the application of the specific scaling factor may be an information element indicating that the UE 200 corresponds to the specific scaling factor.

(6) Operation Example

An operation example of the embodiment will be described below. The multiplicity of UCI over PUCCH is mainly described below.

Figure 5:
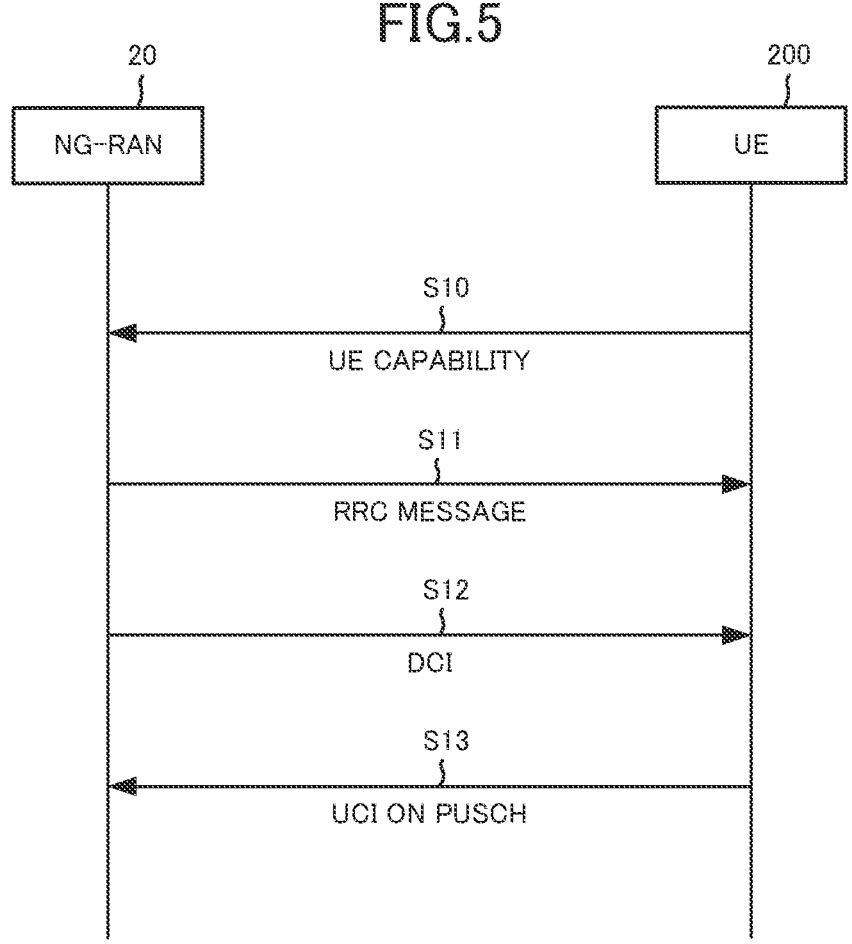
FIG. 5 is a diagram showing an example of operation.

As shown in FIG. 5, in step 10, the UE 200 transmits a message containing UE Capability to the NG-RAN 20. The UE Capability may include an information element regarding the application of a specific scaling factor.

In step 11, the UE 100 receives an RRC message from the NG-RAN 20. The RRC message may include an information element that specifies a particular scaling factor. The RRC message may include an information element that specifies the setting of a possible value for a particular scaling factor. The RRC message may include an information element that specifies the configuration of multiple sets to which a particular scaling factor applies.

In step 12, the UE 200 receives 1 or more DCIs from the NG-RAN 20 via the PDCCH. The DCI may include an information element that specifies a particular scaling factor. The format of the DCI may be the specific DCI format described above.

In step 13, the UE 200 transmits an uplink signal using a PUCCH multiplexed with UCIs having different priorities.

(7) Operational Effects

In an embodiment, UE 200 performs UCI channel coding with different priorities using a newly introduced specific scaling factor. According to this configuration, in a case where UCIs having different priorities are multiplexed to the PUCCH, channel coding of the UCIs multiplexed to the PUCCH can be appropriately executed.

[Modification 1]

A first modification of the embodiment will be described below. Hereinafter, differences with respect to the embodiments will be mainly described.

In the first modification, a case (Below is the separate coding.) in which different UCIs having different priorities are separately encoded in the PUCCH is described. Specifically, a method of determining a PRB (Physical Resource Block) in separate coding will be described.

(1) List of Abbreviations

The following abbreviations are used in existing 3GPP standards.
- r . . . PUCCH resource target code rate
- N^PUCCH_symb·Number of UCI . . . PUCCH symbols
- M^PUCCH_RB . . . Number of PRBs configured for the PUCCH resource
- N^RB_sc, ctrl . . . Information on the number of UCI subcarriers per PRB
- Q_m . . . Modulation parameters The following abbreviations are newly defined abbreviations.
- O_HP_UCI . . . HP UCI Bit Strings to Multiplex
- r_HP_UCI . . . Determined (Target) Code Rate for HP UCIs Multiplexed on Multiple Resources
- O_CRC, HP, UCI . . . CRC bit string for multiplexed HP UCIs
- O_LP_UCI . . . LP UCI Bit Strings to Multiplex
- r_LP_UCI . . . Determined (Target) Code Rate for LP UCI Multiplexed on Multiple Resources
- O_CRC, LP, UCI . . . The CRC bit string for the multiplexed LP UCI When there are M separate HP UCIs in different HP UCI types and N separate LP UCIs in different LP UCI types, each abbreviation is used with the following meanings.
- O^m_HP_UCI . . . m-th multiplexed HP UCI bit string
- r^m_HP_UCI . . . Determined (target) code rate for the mth HP UCI to be multiplexed into a multiresource
- O^m_CRC, HP, UCI . . . CRC bit string for m-th multiplexed HP UCI
- O^n_LP_UCI . . . nth LP UCI bit string to multiplex
- r^n_LP_UCI . . . Determined (target) code rate for nth LP UCI to be multiplexed into Multiresource
- O^n_CRC, LP, UCI . . . CRC bit string for nth multiplexed LP UCI Specifically, the UE 200 (control unit 270) determines the number of PUCCH-related resource blocks (the number of PRBs to be described later) in the separate coding of two or more UCIs. The UE 200 (control unit 270) may determine the number of resource blocks based on an effective code rate determined based on one or more parameters selected from a target code rate of the PUCCH and respective code rate of two or more UCIs. The UE 200 (control unit 270) may determine the number of resource blocks based on the respective code rate of two or more UCIs. The UE 200 (control unit 270) may determine the number of resource blocks based on the respective effective code rate of the two or more UCIs, the respective effective code rate being determined based on the respective code rate of the two or more UCIs.

(2) Overview of Application Examples

In the application example, a method for determining the PRB in the separate coding (extended PRB determination method) will be described.

First, the PRB may be determined based on the effective code rate $r\_e$. For example, the effective code rate $r\_e$ may be determined based on one or more parameters selected from the target code rate r of the PUCCH resource, the code rate $r\_HP\_UCI$ of the HP UCI, and the code rate $r\_LP\_UCI$ of the LP UCI in the absence of further separate coding between the HP UCI bits or between the LP UCI bits.

Where there is further separate coding between the HP UCI bits or between the LP UCI bits, $r\_e$ may be determined based on one or more parameters selected from the target code rate r of the PUCCH resource, the code rate $r\hat{}m\_HP\_UCI$ of the HP UCI, and the code rate $r\hat{}n\_LP\_UCI$ of the LP UCI.

Second, the PRB may be determined based on the HP UCI code rate and the LP UCI code rate. For example, when there is no further separate coding between the HP UCI bits or between the LP UCI bits, the code rate $r\_HP\_UCI$ of the HP UCI and the code rate $r\_LP\_UCI$ of the LP UCI are used as they are. When there is further separate coding between the HP UCI bits or between the LP UCI bits, the code rate $r\hat{}m\_HP\_UCI$ of the HP UCI and the code rate $r\hat{}n\_LP\_UCI$ of the LP UCI are used as they are.

Third, the PRB may be determined based on the effective code rate $r\_e\_HP$ of the HP UCI and the effective code rate $r\_e\_LP$ of the LP UCI. The effective code rate $r\_e\_HP$ of the HP UCI is determined based on the code rate $r\hat{}m\_HP\_UCI$ of the HP UCI, and the effective code rate $r\_e\_LP$ of the LP UCI is determined based on the code rate $r\hat{}m\_LP\_UCI$ of the LP UCI.

(2.1) Applicable Example 1

Application example 1 is an application example for a case where there is no further separate coding between HP UCI bits or between LP UCI bits. In the first application example, the code rate $r\_e$ is used. When the following conditions (specific conditions) are satisfied, the number of PRBs is the minimum value of M^PUCCH_RB, min.

$$(O_{HP\_UCI}+O_{LP\_UCI}+O_{CR,HP\_UCI}+O_{CRC,LP\_UCI}) \leq M_{RB}^{PUCCH} \cdot N_{sc,ctrl}^{RB} \cdot N_{symb-UCI}^{PUCCH} \cdot Q_m \cdot r_e \quad \text{[Equation 1]}$$

The minimum value of M^PUCCH_RB, min is the minimum value of M^PUCCH_RB, min satisfying the following conditions.

$$(O_{HP\_UCI}+O_{LP\_UCI}+O_{CRC,HP\_UCI}+O_{CRC,LP\_UCI}) \leq N_{RB,min}^{PUCCH} \cdot N_{sc,ctrl}^{RB} \cdot N_{symb-UCI}^{PUCCH} \cdot Q_m \cdot r_e \quad \text{[Equation 2]}$$

If the above specific conditions are not satisfied, the number of PRBs is M^PUCCH_RB.

If the number of allowed PRBs for a specific PUCCH format is limited and M^PUCCH_RB, min is not included in the allowed number of PRBs, M^PUCCH_RB, min may be increased to the allowed number of PRBs closest to M^PUCCH_RB, min.

As described above, the code rate $r\_e$ may be determined based on one or more parameters selected from the target code rate r of the PUCCH resource, the code rate $r\_HP\_UCI$ of the HP UCI, and the code rate $r\_LP\_UCI$ of the LP UCI.

In Example 1, $r\_e$ may be determined using r. For example, $r\_e$ may be $r\_e=r$ or $r\_e=\alpha \cdot r$. $\alpha_m$ay be a value specified by the DCI, may be a value set by the RRC message, may be a predetermined fixed value, or may be a value determined based on the HP UCI bit and the LP UCI bit.

In Example 2, $r\_e$ may be determined using the HP UCI code rate $r\_HP\_UCI$. For example, $r\_e$ may be $r\_e=r\_HP\_UCI$ or $r\_e=\alpha \cdot r\_HP\_UCI$. $\alpha_m$ay be a value specified by the DCI, may be a value set by the RRC message, may be a predetermined fixed value, or may be a value determined based on the HP UCI bit and the LP UCI bit.

In Example 3, $r\_e$ may be determined using the LP UCI code rate $r\_LP\_UCI$. For example, $r\_e$ may be $r\_e=r\_LP\_UCI$ or $r\_e=\alpha \cdot r\_LP\_UCI$. $\alpha_m$ay be a value specified by the DCI, may be a value set by the RRC message, may be a predetermined fixed value, or may be a value determined based on the LP UCI bit and the LP UCI bit.

In Example 4, $r\_e$ may be determined using the target code rate r of the PUCCH resource and the code rate r_HP_UCI of the HP UCI. For example, r_e may be r_e=min (r, r_HP_UCI), r_e=max (r, r_HP_UCI), r_e=avg (r, r_HP_UCI), or r_e=$\alpha_1$, r+$\alpha_2$, or r_HP_UCI. $\alpha_1$ and $\alpha_2$ may be values specified by the DCI, may be values set by the RRC message, may be predetermined fixed values, or may be values determined based on the HP UCI bit and the LP UCI bit.

In Example 5, r_e may be determined using the target code rate r of the PUCCH resource and the code rate r_LP_UCI of the LP UCI. For example, r_e may be r_e=min (r, r_LP_UCI), r_e=max (r, r_LP_UCI), r_e=avg (r, r_LP_PUCI), or r_e=$\alpha_i$, r+$\alpha_2$, r_LP_UCI. $\alpha_1$ and $\alpha_2$ may be values specified by the DCI, may be values set by the RRC message, may be predetermined fixed values, or may be values determined based on the LP UCI bit and the LP UCI bit.

In Example 6, r_e may be determined using the HP UCI code rate r_HP_UCI and the LP UCI code rate r_LP_UCI. For example, r_e may be r_e=min (r_HP_UCI, r_LP_UCI, r_e=max (r_HP_UCI, r_LP_UCI), r_e=avg (r_HP_UCI, r_LP_UCI), or r_e=$\alpha_1$, r_HP_UCI+$\alpha_2$, or r_LP_UCI. $\alpha_1$ and $\alpha_2$ may be values specified by the DCI, may be values set by the RRC message, may be predetermined fixed values, or may be values determined based on the LP UCI bit and the LP UCI bit.

In Example 7, r_e may be determined using the target code rate r of the PUCCH resource, the code rate r_HP_UCI of the HP UCI, and the code rate r_LP_UCI of the LP UCI. For example, r_e may be r_e=min (r, r_HP_UCI, r_LP_UC), r_e=max (r, r_HP_UCI, r_LP_UCI), r_e=avg (r, r_HP_UCI, r_LP_UC), or r_e=$\alpha_0$, r+$\alpha_1$, r_HP_UCI+$\alpha_2$, r_LP_UCI. $\alpha_0$, $\alpha_1$ and $\alpha_2$ may be values specified by the DCI, may be values set by the RRC message, may be predetermined fixed values, or may be values determined based on the HP UCI bit and the LP UCI bit.

(2.2) Applicable Example 2

Application example 2 is an application example for a case where there is no further separate coding between HP UCI bits or between LP UCI bits. In the application example 2, the code rate r_HP_UCI of the HP UCI and the code rate r_LP_UCI of the LP UCI are used. When the following conditions (specific conditions) are satisfied, the number of PRBs is the minimum value of M^PUCCH_RB, min.

$$\left( \frac{O_{HP\_UCI} + O_{CRC,HP\_UCI}}{Q_m \cdot r_{HP\_UCI}} + \frac{O_{LP\_UCI} + O_{CRC,LP\_UCI}}{Q_m \cdot r_{LP\_UCI}} \right) \leq M_{RB}^{PUCCH} \cdot N_{sc,ctrl}^{RB} \cdot N_{symb-UCI}^{PUCCH} \quad \text{[Equation 3]}$$

The minimum value of M^PUCCH_RB, min is the minimum value of M^PUCCH_RB, min satisfying the following conditions.

$$\left( \frac{O_{HP\_UCI} + O_{CRC,HP\_UCI}}{Q_m \cdot r_{HP\_UCI}} + \frac{O_{LP\_UCI} + O_{CRC,LP\_UCI}}{Q_m \cdot r_{LP\_UCI}} \right) \leq M_{RB,min}^{PUCCH} \cdot N_{sc,ctrl}^{RB} \cdot N_{symb-UCI}^{PUCCH} \quad \text{[Equation 4]}$$

If the above specific conditions are not satisfied, the number of PRBs is M^PUCCH_RB.

If the number of allowed PRBs for a specific PUCCH format is limited and M^PUCCH_RB, min is not included in the allowed number of PRBs, M^PUCCH_RB, min may be increased to the allowed number of PRBs closest to M^PUCCH_RB, min.

(2.3) Applicable Example 3

Application example 3 is an application example for a case where there is further separate coding between HP UCI bits or between LP UCI bits. In the application example 3, the code rate r_e is used. When the following conditions (specific conditions) are satisfied, the number of PRBs is the minimum value of M^PUCCH_RB, min.

$$\left( \sum_{m=1}^{M} O_{HP_{UCI}}^m + \sum_{n=1}^{N} O_{LP_{UCI}}^n + \sum_{m=1}^{M} O_{CRC,HP_{UCI}}^m + \sum_{n=1}^{N} O_{CRC,LP_{UCI}}^n \right) \leq M_{RB}^{PUCCH} \cdot N_{sc,ctrl}^{RB} \cdot N_{symb-UCI}^{PUCCH} \cdot Q_m \cdot r_e \quad \text{[Equation 5]}$$

The minimum value of M^PUCCH_RB, min is the minimum value of M^PUCCH_RB, min satisfying the following conditions.

$$\left( \sum_{m=1}^{M} O_{HP_{UCI}}^m + \sum_{n=1}^{N} O_{LP_{UCI}}^n + \sum_{m=1}^{M} O_{CRC,HP_{UCI}}^m + \sum_{n=1}^{N} O_{CRC,LP_{UCI}}^n \right) \leq M_{RB,min}^{PUCCH} \cdot N_{sc,ctrl}^{RB} \cdot N_{symb-UCI}^{PUCCH} \cdot Q_m \cdot r_e \quad \text{[Equation 6]}$$

If the above specific conditions are not satisfied, the number of PRBs is M^PUCCH_RB.

If the number of allowed PRBs for a specific PUCCH format is limited and M^PUCCH_RB, min is not included in the allowed number of PRBs, M^PUCCH_RB, min may be increased to the allowed number of PRBs closest to M^PUCCH_RB, min.

As described above, the code rate r_e may be determined based on one or more parameters selected from the target code rate r of the PUCCH resource, the code rate r_HP_UCI of the HP UCI, and the code rate r_LP_UCI of the LP UCI.

In Example 1, r_e may be determined using r. For example, r_e may be r_e=r or r_e=$\alpha$·r. $\alpha_m$ay be a value specified by the DCI, may be a value set by the RRC message, may be a predetermined fixed value, or may be a value determined based on the HP UCI bit and the LP UCI bit.

In Example 2, r_e may be determined using the code rate r_HP_UCI of one or more HP UCIs selected from {r^1_HP UCI, . . . r^m_HP_UCI, . . . r^M_HP_UCI). For example, the code rate r_HP_UCI of one or more HP UCIs may be all r_m_HP_UCIs, may be a value specified by a DCI, may be a value set by an RRC message, or may be a predetermined fixed value. The code rate r_HP_UCI of one or more HP UCIs may be a value predetermined by the type of UCI or may be a value specified by gNB by the type of UCI. For example, r_e may be r_e=min {r^1_HP_UCI, . . . r^m_HP_UCI, . . . r^M_HP_UCI), r_e=max (r^1_HP_UCI, . . . r^m_HP_UCI, . . . r^M_HP_UCI}, r_e=ave (r^1_HP_UCI, . . . r^m_HP_UCI, . . . r^M_HP_UCI}, or r_e=$\Sigma\alpha_m$·r^m_HP_UCI. $\alpha_m$ may be a value specified by the DCI, may be a value set by the RRC message, may be a predetermined fixed value, or may be a value determined based on the HP UCI bit and the LP UCI bit.

In Example 3, r_e may be determined using the code rate r_LP_UCI of one or more LP UCIs selected from {r^1_LP_UCI, ... r^n_LP_UCI, ... r^N_LP_UCI}. For example, the code rate r_LP_UCI of one or more LP UCIs may be all r^n_LP_UCIs, may be a value specified by a DCI, may be a value set by an RRC message, or may be a predetermined fixed value. The code rate r_LP_UCI of one or more LP UCIs may be a value predetermined by the type of UCI or a value specified by gNB by the type of UCI. For example, r_e may be r_e=min {r^1_LP_UCI, ... r^n_L-P_UCI, ... r^N_LP_UCI}, r_e=max {r^1_LP_UCI, ... r^n_LP_UCI, ... r^N_LP_UCI}, r_e=ave {r^1_LP_UCI, ... r^n_LP_UCI, ... r^N_LP_UCI}, or r_e=$\Sigma\alpha_n$·r^n_LP_UCI. $\alpha_n$ may be a value specified by the DCI, may be a value set by the RRC message, may be a predetermined fixed value, or may be a value determined based on the LP UCI bit and the LP UCI bit.

In Example 4, r_e may be determined using the target code rate r of the PUCCH resource and the code rate r_HP_UCI of one or more HP UCIs selected from {r^1_HP_UCI, ... r^m_HP_UCI, ... r^M_HP_UCI}. For example, the code rate r_HP_UCI of one or more HP UCIs may be all r_m_HP_UCIs, may be a value specified by a DCI, may be a value set by an RRC message, or may be a predetermined fixed value. The code rate r_HP_UCI of one or more HP UCIs may be a value predetermined by the type of UCI or may be a value specified by gNB by the type of UCI. For example, r_e may be r_e=min {r, r^1_HP_UCI, ... r^m_HP_UCI, ... r^M_HP_UCI}, r_e=max {r, r^1_HP_UCI, ... r^m_HP_UCI, ... r^M_HP_UCI}, r_e=ave {r, r^1_HP_UCI, ... r^m_HP_UCI, ... r^M_HP_UCI}, or r_e=$\alpha_1$·r+$\Sigma\alpha_m$·r^m_HP_UCI. $\alpha_1$ and $\alpha_M$ may be values specified by the DCI, may be values set by the RRC message, may be predetermined fixed values, or may be values determined based on the HP UCI bit and the LP UCI bit.

In Example 5, r_e may be determined using the target code rate r of the PUCCH resource and the code rate r_LP_UCI of one or more LP UCIs selected from {r^1_LP_UCI, ... r^n_LP_UCI, ... r^N_LP_UCI}. For example, the code rate r_LP_UCI of one or more LP UCIs may be all r^n_LP_UCIs, may be a value specified by a DCI, may be a value set by an RRC message, or may be a predetermined fixed value. The code rate r_LP_UCI of one or more LP UCIs may be a value predetermined by the type of UCI or a value specified by gNB by the type of UCI. For example, r_e may be r_e=min {r, r^1_LP_UCI, ... r^n_L-P_UCI, ... r^N_LP_UCI), r_e=max {r, r^1_LP_UCI, ... r^n_LP_UCI, ... r^N_LP_UCI}, r_e=ave (r, r^1_LP_UCI, ... r^n_LP_UCI, ... r^N_LP_UCI}, or r_e=$\alpha_1$·r+$\Sigma\alpha_n$·r^n_LP_UCI. $\alpha_1$ and $\alpha_n$ may be values specified by the DCI, may be values set by the RRC message, may be predetermined fixed values, or may be values determined based on the LP UCI bit and the LP UCI bit.

In Example 6, r_e may be determined using a code rate r_HP_UCI of one or more HP UCIs selected from {r^1_HP_UCI, ... r^m_HP_UCI, ... r^M_HP_UCI} and a code rate r_LP_UCI of one or more LP UCIs selected from {r^1_LP_UCI, ... r^n_LP_UCI, ... r^N_LP_UCI}. For example, the code rate r_HP_UCI of one or more HP UCIs may be all r^n_HP_UCIs, may be a value specified by a DCI, may be a value set by an RRC message, or may be a predetermined fixed value. The code rate r_HP_UCI of one or more HP UCIs may be a value predetermined by the type of UCI or may be a value specified by gNB by the type of UCI. Similarly, the code rate r_LP_UCI of one or more LP UCIs may be all r^n_LP_UCIs, may be a value specified by a DCI, may be a value set by an RRC message, or may be a predetermined fixed value. The code rate r_LP_UCI of one or more LP UCIs may be a value predetermined by the type of UCI or a value specified by gNB by the type of UCI. For example, r_e may be r_e=min {r^1_HP_UCI, ... r^m_H-P_UCI, ... r^M_HP_UCI, r^1_LP_UCI, ... r^n_LP_UCI ... r^N_LP_UCI}, r_e=max {r^1_HP_UCI, ... r^m_HP_UCI, ... r^M_HP_UCI, r^1_LP_UCI, ... r^n_L-P_UCI, ... r^N_LP_UCI), r_e=ave (r^1_HP_UCI, ... r^m_HP_UCI, ... r^M_HP_UCI, r^1_LP_UCI, ... r^n_L-P_UCI, ... r^N_LP_UCI}, or r_e=r+$\Sigma\alpha_m$·r^m_HP_UCI+$\Sigma\alpha_n$·r^n_LP_UCI. $\alpha_m$ and $\alpha_n$ may be values specified by the DCI, may be values set by the RRC message, may be predetermined fixed values, or may be values determined based on the LP UCI bit and the LP UCI bit.

In Example 7, r_e may be determined using the target code rate r of the PUCCH resource, the code rate r_HP_UCI of one or more HP UCIs selected from {r^1_HP_UCI, ... r^m_HP_UCI, ... r^M_HP_UCI}, and the code rate r_LP_UCI of one or more LP UCIs selected from {r^1_LP_UCI, ... r^n_LP_UCI, ... r^N_LP_UCI}. For example, the code rate r_HP_UCI of one or more HP UCIs may be all r^n_HP_UCIs, may be a value specified by a DCI, may be a value set by an RRC message, or may be a predetermined fixed value. The code rate r_HP_UCI of one or more HP UCIs may be a value predetermined by the type of UCI or may be a value specified by gNB by the type of UCI. Similarly, the code rate r_LP_UCI of one or more LP UCIs may be all r^n_LP_UCIs, may be a value specified by a DCI, may be a value set by an RRC message, or may be a predetermined fixed value. The code rate r_LP_UCI of one or more LP UCIs may be a value predetermined by the type of UCI or a value specified by gNB by the type of UCI. For example, r_e may be r_e=min {r, r^1_HP_UCI, ... r^m_H-P_UCI, ... r^M_HP_UCI, r^1_LP_UCI, ... r^n_LP_UCI, ... r^N_LP_UCI), r_e=max {r, r^1_HP_UCI, ... r^m_HP_UCI, ... r^M_HP_UCI, r^1_LP_UCI, ... r^n_L-P_UCI, ... r^N_LP_UCI}, r_e=ave (r, r^1_HP_UCI, ... r^m_HP_UCI, ... r^M_HP_UCI, r^1_LP_UCI, ... r^n_L-P_UCI, ... r^N_LP_UCI}, or r_e=$\alpha_0$·r+r+$\Sigma\alpha_m$·r^m_HP_UCI+$\Sigma\alpha_n$·r^n_LP_UCI. $\alpha_0$, $\alpha_m$ and $\alpha_n$ may be values specified by the DCI, may be values set by the RRC message, may be predetermined fixed values, or may be values determined based on the LP UCI bit and the LP UCI bit.

(2.4) Applicable Example 4

Application example 4 is an application example for a case where there is further separate coding between HP UCI bits or between LP UCI bits. In the application example 4, the effective code rate r_e_HP_UCI of the HP UCI and the effective code rate r_e_LP_UCI of the LP UCI are used. When the following conditions (specific conditions) are satisfied, the number of PRBs is the minimum value of M^PUCCH_RB, min.

$$\left( \frac{\sum_{m=1}^{M} O_{HP_{UCI}}^{m} + \sum_{m=1}^{M} O_{CRC,HP_{UCI}}^{m}}{Q_m \cdot r_{e_{HP}}} + \frac{\sum_{n=1}^{N} O_{LP_{UCI}}^{n} + \sum_{n=1}^{N} O_{CRC,LP_{UCI}}^{n}}{Q_m \cdot r_{e_{LP}}} \right) \leq$$

$$M_{RB}^{PUCCH} \cdot N_{sc,ctrl}^{RB} \cdot N_{symb-UCI}^{PUCCH}$$

[Equation 7]

The minimum value of M^PUCCH_RB, min is the minimum value of M^PUCCH_RB, min satisfying the following conditions.

$$\left( \frac{\sum_{m=1}^{M} O_{HP\_UCI}^{m} + \sum_{m=1}^{M} O_{CRC,HP\_UCI}^{n}}{Q_m \cdot r_{e_{HP}}} + \frac{\sum_{n=1}^{N} O_{LP\_UCI}^{n} + \sum_{n=1}^{N} O_{CRC,LP\_UCI}^{n}}{Q_m \cdot r_{e_{LP}}} \right) \leq M_{RB,min}^{PUCCH} \cdot N_{sc,ctrl}^{RB} \cdot N_{symb-UCI}^{PUCCH}$$

[Equation 8]

If the above specific conditions are not satisfied, the number of PRBs is M^PUCCH_RB.

If the number of allowed PRBs for a specific PUCCH format is limited and M^PUCCH_RB, min is not included in the allowed number of PRBs, M^PUCCH_RB, min may be increased to the allowed number of PRBs closest to M^PUCCH_RB, min.

Here, r_e_HP_UCI may be determined based on the code rate r_HP_UCI of one or more HP UCIs selected from {a r^1_HP_UCI, ... r^m_HP_UCI, ... r^M_HP_UCI}. For example, the code rate r_HP_UCI of one or more HP UCIs may be all r^n_HP_UCIs, may be a value specified by a DCI, may be a value set by an RRC message, or may be a predetermined fixed value. The code rate r_HP_UCI of one or more HP UCIs may be a value predetermined by the type of UCI or may be a value specified by gNB by the type of UCI. For example, r_e_HP_UCI may be r_e_HP_UCI=min {r^1_HP_UCI, ... r^m_HP_UCI, ... r^M_HP_UCI}, r_e_HP_UCI=max {r^1_HP_UCI, ... r^m_HP_UCI, ... r^M_HP_UCI}, r_e_HP_UCI=ave {r^1_HP_UCI, ... r^m_HP_UCI, ... r^M_HP_UCI}, or r_e_HP UCI=Σα_m·r^m_HP_UCI. α_m may be a value specified by the DCI, may be a value set by the RRC message, may be a predetermined fixed value, or may be a value determined based on the HP UCI bit and the LP UCI bit.

Similarly, r_e_LP_UCI may be determined using the code rate r_LP_UCI of one or more LP UCIs selected from {r^1_LP_UCI, ... r^n_LP_UCI, ... r^N_LP_UCI}. The code rate r_LP_UCI of one or more LP UCIs may be all r^n_LP_UCIs, may be a value specified by a DCI, may be a value set by an RRC message, or may be a predetermined fixed value. The code rate r_LP_UCI of one or more LP UCIs may be a value predetermined by the type of UCI or a value specified by gNB by the type of UCI. For example, r_e_LP_UCI may be r_e_LP_UCI=min {r^1_LP_UCI, ... r^n_LP_UCI, ... r^N_LP_UCI}, r_e_LP_UCI=max {r^1_LP_UCI, ... r^n_LP_UCI, ... r^N_LP_UCI}, r_e_LP_UCI=ave {r^1_LP_UCI, ... r^n_LP_UCI, ... r^N_LP_UCI}, or r_e_LP_UCI=Σα_n·r^n_LP_UCI. α_n may be a value specified by the DCI, may be a value set by the RRC message, may be a predetermined fixed value, or may be a value determined based on the LP UCI bit and the LP UCI bit.

(2.5) Applicable Example 5

Application example 5 is an application example for a case where there is further separate coding between HP UCI bits or between LP UCI bits. In the application example 5, the code rate r^m_HP_UCI of each coding part of the HP UCI and the code rate r^n_LP_UCI of each coding part of the LP UCI are used. When the following conditions (specific conditions) are satisfied, the number of PRBs is the minimum value of M^PUCCH_RB, min.

$$\left( \sum_{m=1}^{M} \frac{O_{HP\_UCI}^{m} + O_{CRC\_HP\_UCI}^{m}}{Q_m \cdot r_{HP\_UCI}^{m}} + \sum_{n=1}^{N} \frac{O_{HP\_UCI}^{n} + O_{CRC\_HP\_UCI}^{n}}{Q_m \cdot r_{HP\_UCI}^{n}} \right) \leq M_{RB}^{PUCCH} \cdot N_{sc,ctrl}^{RB} \cdot N_{symb-UCI}^{PUCCH}$$

[Equation 9]

The minimum value of M^PUCCH_RB, min is the minimum value of M^PUCCH_RB, min satisfying the following conditions.

$$\left( \sum_{m=1}^{M} \frac{O_{HP\_UCI}^{m} + O_{CRC\_HP\_UCI}^{m}}{Q_m \cdot r_{HP\_UCI}^{m}} + \sum_{n=1}^{N} \frac{O_{LP\_UCI}^{n} + O_{CRC\_LP\_UCI}^{n}}{Q_m \cdot r_{LP\_UCI}^{n}} \right) \leq M_{RB,min}^{PUCCH} \cdot N_{sc,ctrl}^{RB} \cdot N_{symb-UCI}^{PUCCH}$$

[Equation 10]

If the above specific conditions are not satisfied, the number of PRBs is M^PUCCH_RB.

If the number of allowed PRBs for a specific PUCCH format is limited and M^PUCCH_RB, min is not included in the allowed number of PRBs, M^PUCCH_RB, min may be increased to the allowed number of PRBs closest to M^PUCCH_RB, min.

Other Embodiments

Although the contents of the present invention have been described in accordance with the embodiments described above, it is obvious to those skilled in the art that the present invention is not limited to these descriptions and that various modifications and improvements are possible.

Although not specifically mentioned in the above disclosure, the specific scaling factor (omega_LP_HP, omega_HP, omega_LP) may be set by upper layer parameters. The specific scale factor may be predetermined in radio communication system. The specific scale factor may be set by upper layer parameters and reported as UE Capability from UE 200 to NG-RAN 20.

Although not specifically mentioned in the above disclosure, information elements that identify specific scaling factors may be included in the MAC CE message. For example, the application of the DCI described above may be implemented by MAC CE notification.

Although not specifically mentioned in the above disclosure, the priority may be determined as follows. For example, the priority of HARQ-ACK may be higher than the priority of SR. The priority for URLLC (Ultra Reliable and Low Latency Communications) may be higher than the priority for eMBB (enhanced Mobile Broadband).

Although not specifically mentioned in the above disclosure, in HP UCI and LP UCI multiplexing with separate coding, the target code rate (For example, r_HP_UCI, r_LP_UCI, r_^m_HP_UCI, r^n_LP_UCI, and so on.) may be determined based on the gNB indication or may be determined by other methods.

Although not specifically mentioned in the above disclosure, the choice of using any of the above described application examples 1 to 5 to determine the PRB may be based on the method of selecting PUCCH resources in HP UCI and LP UCI multiplexes with separate coding. For example, in the lax option of selecting a PUCCH resource having redundant resources based on the target code rate of the PUCCH resource used for selecting the PUCCH resource (lower than the code rates of the HP UCI and LP UCI), any application may be selected. On the other hand, in the strict option of selecting a PUCCH resource having redundant resources based on the code rates of the HP UCI and the LP UCI, an application example using the code rates of the HP UCI and the LP UCI as they are may be selected.

Although not specifically mentioned in the above disclosure, information elements (For example, the target code rate) required for separate coding may be set by upper layer parameters. Information elements required for separate coding may be reported from UE 200 as UE Capability. The information elements required for the separate coding may be predetermined. Information elements required for the separate coding may be set based on upper layer parameters and UE Capability. The information elements required for the separate coding may be determined based on the type of UCI contained in the multiplexed UCI bits.

Although not specifically mentioned in the above disclosure, the UE Capability may include an information element indicating whether separate coding of UCIs with different priorities is supported by UE 200. The UE Capability may include an information element that indicates whether the UE Capability has the ability to perform a selection of PUCCH resources (sets) based on the LP UCI and HP UCI code rates.

The block configuration diagram (FIG. 4) used in the description of the above-described embodiment shows blocks in units of functions. Those functional blocks (structural components) can be realized by a desired combination of at least one of hardware and software. Means for realizing each functional block is not particularly limited. That is, each functional block may be implemented using a physically or logically coupled device, or may be implemented using two or more physically or logically separated devices connected directly or indirectly (For example, by using wired, wireless, etc.). The functional block may be implemented by combining software with the one device or the plurality of devices.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, the functional block (component) that functions the transmission is called a transmission unit (transmitting unit) or a transmitter. As described above, there is no particular limitation on the method of implementation.

Figure 6:
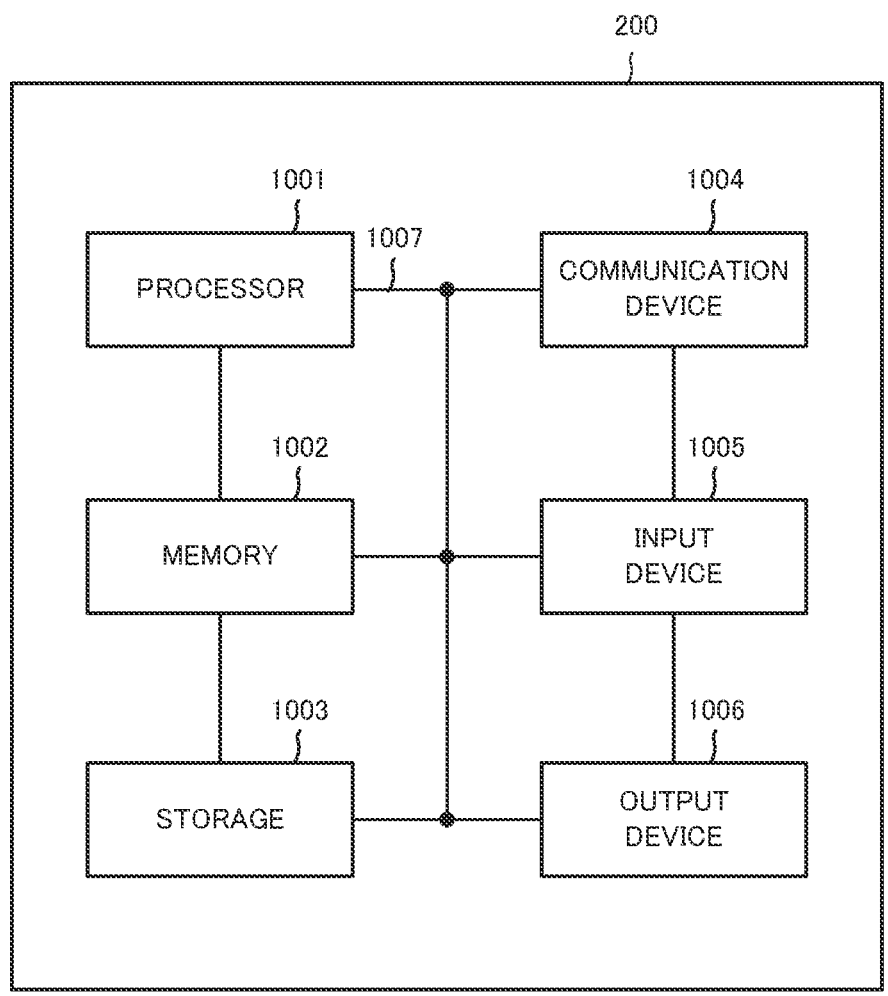
FIG. 6 shows an example of the hardware configuration of the UE 200.

Further, the UE 200 may function as a computer that performs processing of the radio communication method of the present disclosure. FIG. 6 is a diagram showing an example of a hardware configuration of the apparatus. As shown in FIG. 6, the device may be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. The hardware configuration of the device may be configured to include one or more of the devices shown in the figure, or may be configured to exclude some of the devices.

Each functional block of the device (see FIG. 4) is implemented by any hardware element or combination of hardware elements of the computer device.

Moreover, the processor 1001 performs computing by loading a predetermined software (computer program) on hardware such as the processor 1001 and the memory 1002, and realizes various functions of the reference device by controlling communication via the communication device 1004, and controlling reading and/or writing of data on the memory 1002 and the storage 1003.

The processor 1001 operates, for example, an operating system to control the entire computer. Processor 1001 may comprise a central processing unit (CPU) including interfaces to peripheral devices, controllers, arithmetic units, registers, and the like.

Moreover, the processor 1001 reads a computer program (program code), a software module, data, and the like from the storage 1003 and/or the communication device 1004 into the memory 1002, and executes various processes according to the data. As the computer program, a computer program that is capable of executing on the computer at least a part of the operation explained in the above embodiments is used. Further, the various processes described above may be executed by one processor 1001, or may be executed simultaneously or sequentially by two or more processors 1001. The processor 1001 can be implemented by using one or more chips. Alternatively, the computer program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. Memory 1002 may be referred to as a register, cache, main memory, or the like. The memory 1002 may store programs (program codes), software modules, and the like that are capable of executing the method according to one embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

Devices such as the processor 1001 and the memory 1002 are connected by a bus 1007 for communicating information. The bus 1007 may be configured using a single bus or may be configured using different buses for each device.

In addition, the device may comprise hardware such as a microprocessor, a digital signal processor (DSP), an application specific integrated circuit (ASIC), a programmable logic device (PLD), a field programmable gate array (FPGA), and the hardware may implement some or all of each functional block. For example, the processor 1001 may be implemented by using at least one of these hardware.

Further, the notification of the information is not limited to the mode/embodiment described in the present disclosure, and other methods may be used. For example, notification of information may be performed by physical layer signaling (e.g., Downlink Control Information (DCI), Uplink Control Information (UCI), higher layer signaling (e.g., RRC signaling, Medium Access Control (MAC) signaling, broadcast information (Master Information Block (MIB), System Information Block (SIB)), other signals, or a combination thereof. The RRC signaling may also be referred to as an RRC message, for example, an RRC Connection Setup message, an RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

The processing procedures, sequences, flowcharts, and the like of each aspect/embodiment described in the present disclosure may be changed in order as long as there is no contradiction. For example, the methods described in this disclosure use an exemplary sequence to present the elements of the various steps and are not limited to the particular sequence presented.

The specific operation that is performed by the base station in the present disclosure may be performed by its upper node in some cases. In a network comprising one or more network nodes having a base station, it is apparent that various operations performed for communication with a terminal may be performed by the base station and at least one of other network nodes (For example, but not limited to MME or S-GW) other than the base station. In the above, an example in which there is one network node other than the base station is explained; however, a combination of a plurality of other network nodes (for example, MME and S-GW) may be used.

Information and signals (information, etc.) can be output from an upper layer (or a lower layer) to a lower layer (or an upper layer). It may be input and output via a plurality of network nodes.

The input/output information can be stored in a specific location (for example, a memory) or can be managed in a management table. The input and output information may be overwritten, updated, or appended. The information can be deleted after outputting. The inputted information can be transmitted to another device.

The determination may be made by a value represented by one bit (0 or 1), by a Boolean value (Boolean: true or false), or by a comparison of numerical values (For example, comparison with a given value).

Each of the aspects/embodiments described in the present disclosure may be used alone, in combination, or switched over in accordance with implementation. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, if software is transmitted from a website, server, or other remote source using at least one of wired (Coaxial cable, fiber-optic cable, twisted-pair, digital subscriber subscriber line (DSL), etc.) and wireless (Infrared, microwave, etc.) technologies, at least one of these wired and wireless technologies is included within the definition of a transmission medium.

Information, signals, or the like mentioned above may be represented by using any of a variety of different technologies. For example, data, instructions, commands, information, signals, bits, symbols, chips, etc. that may be referred to throughout the above description may be represented by voltages, currents, electromagnetic waves, magnetic fields or magnetic particles, optical fields or photons, or any combination thereof.

It should be noted that terms described in this disclosure and terms necessary to understand this disclosure may be replaced with terms having the same or similar meaning. For example, at least one of the channel and the symbol may be a signal (signaling). The signal may also be a message. Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like explained in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station may house one or more (For example, three) cells, also referred to as sectors. In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a portion or the entire coverage area of at least one of a base station and a base station subsystem performing communication services in this coverage.

In the present disclosure, the terms "mobile station (Mobile Station: MS)", "user terminal", "user equipment (User Equipment: UE)", "terminal" and the like can be used interchangeably.

A mobile station may be referred to by one skilled in the art as a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be called a transmitting device, a receiving device, a communication device, or the like. Note that, at least one of a base station and a mobile station may be a device mounted on a moving body, a moving body itself, or the like. The mobile body may be a vehicle (For example, cars, planes, etc.), an unmanned mobile body (Drones, self-driving cars, etc.), or a robot (manned or unmanned). At least one of a base station and a mobile station can be a device that does not necessarily move during the communication operation. For example, at least one of a base station and a mobile station may be an Internet of Things (IoT) device such as a sensor.

The base station in the present disclosure may be read as a mobile station (user terminal). For example, each aspect/embodiment of the present disclosure may be applied to a configuration in which communication between a base station and a mobile station is replaced with communication between a plurality of mobile stations (For example, it may be called Device-to-Device (D2D), Vehicle-to-Everything (V2X), etc.). In this case, the mobile station may have the function of the base station. In addition, words such as "up" and "down" may be replaced with words corresponding to communication between terminals (For example, "side".). For example, terms an uplink channel, a downlink channel, or the like may be read as a side channel.

Similarly, the mobile station in the present disclosure may be read as a base station. In this case, the base station may have the function of the mobile station.

The radio frame may comprise one or more frames in the time domain. Each frame or frames in the time domain may be referred to as a sub-frame.

The subframe may further comprise one or more slots in the time domain. The subframe may be a fixed time length (For example, 1 me) independent of the numerology.

Pneumerology may be a communication parameter applied to at least one of transmission and reception of a signal or channel. The numerology can include one among, for example, subcarrier spacing (SubCarrier Spacing: SCS), bandwidth, symbol length, cyclic prefix length, transmission time interval (Transmission Time Interval: TTI), number of symbols per TTI, radio frame configuration, a specific filtering process performed by a transceiver in the frequency domain, a specific windowing process performed by a transceiver in the time domain, and the like.

The slot may comprise one or more symbols (Orthogonal Frequency Division Multiplexing (OFDM)) symbols, single carrier frequency division multiple access (SC-FDMA) symbols, etc.) in the time domain. A slot may be a unit of time based on the numerology.

A slot may include a plurality of minislots. Each minislot may comprise one or more symbols in the time domain. A minislot may also be called a subslot. A minislot may be composed of fewer symbols than slots. A PDSCH (or PUSCH) transmitted in time units larger than the minislot may be referred to as a PDSCH (or PUSCH) mapping type A. A PDSCH (or PUSCH) transmitted using a minislot may be referred to as a PDSCH (or PUSCH) mapping type B.

Each of the radio frame, subframe, slot, mini lot, and symbol represents a time unit for transmitting a signal. Different names may be used for the radio frame, subframe, slot, minislot, and symbol.

For example, one subframe may be referred to as the transmission time interval (TTI), a plurality of consecutive subframes may be referred to as TTI, and one slot or one minislot may be referred to as TT. That is, at least one of the sub-frame and TTI may be a sub-frame (1 ms) in the existing LTE, a period shorter than 1 ms (For example, 1-13 symbols), or a period longer than 1 ms. Note that, a unit representing TTI may be called a slot, a minislot, or the like instead of a subframe.

Here, TTI refers to the minimum time unit of scheduling in radio communication, for example. Here, TTI refers to the minimum time unit of scheduling in radio communication, for example. For example, in the LTE system, the base station performs scheduling for allocating radio resources (frequency bandwidth, transmission power, etc. that can be used in each user terminal) to each user terminal in units of TTI. The definition of TTI is not limited to this.

The TTI may be a transmission time unit such as a channel-encoded data packet (transport block), a code block, or a code word, or may be a processing unit such as scheduling or link adaptation. When TTI is given, a time interval (for example, the number of symbols) in which a transport block, a code block, a code word, etc. are actually mapped may be shorter than TTI.

When one slot or one minislot is called TTI, one or more TTIs (That is, one or more slots or one or more minislots) may be the minimum time unit for scheduling. The number of slots (minislot number) constituting the minimum time unit of the scheduling may be controlled.

TTI having a time length of 1 ms may be referred to as an ordinary TTI (TTI in LTE Rel. 8-12), a normal TTI, a long TTI, a normal subframe, a normal subframe, a long subframe, a slot, and the like. A TTI shorter than a normal TTI may be referred to as a shortened TTI, a short TTI, a partial or fractional TTI, a shortened subframe, a short subframe, a minislot, a subslot, a slot, or the like.

In addition, a long TTI (for example, ordinary TTI, subframe, etc.) may be read as TTI having a time length exceeding 1 ms, and a short TTI (for example, shortened TTI) may be read as TTI having TTI length of less than the TTI length of the long TTI but TTI length of 1 ms or more.

The resource block (RB) is a resource allocation unit in the time domain and the frequency domain, and may include one or more continuous subcarriers in the frequency domain. The number of subcarriers included in RB may be, for example, twelve, and the same regardless of the topology. The number of subcarriers included in the RB may be determined based on the neurology.

The time domain of the RB may also include one or more symbols and may be one slot, one minislot, one subframe, or one TTI in length. The one TTI, one subframe, and the like may each comprise one or a plurality of resource blocks.

The one or more RBs may be referred to as a physical resource block (PRB), a sub-carrier group (SCG), a resource element group (REG), a PRB pair, an RB pair, or the like.

The resource block may comprise one or more resource elements (REs). For example, one RE may be a radio resource area of one subcarrier and one symbol.

A bandwidth part (BWP) (which may be called a partial bandwidth, etc.) may represent a subset of contiguous common resource blocks (RBs) for a certain neurology in a certain carrier. Here, the common RB may be specified by an index of the RB based on the common reference point of the carrier. PRB may be defined in BWP and numbered within that BWP.

BWP may include UL BWP (UL BWP) and DL BWP (DL BWP). One or more BWPs may be set in one carrier for the UE.

At least one of the configured BWPs may be active, and the UE may not expect to send and receive certain signals/channels outside the active BWP. Note that "cell", "carrier", and the like in this disclosure may be read as "BWP".

The above-described structures such as a radio frame, subframe, slot, minislot, and symbol are merely examples. For example, the number of subframes contained in a radio frame, the number of slots per subframe or radio frame, the number of minislots contained in a slot, the number of symbols and RBs contained in a slot or minislot, the number of subcarriers contained in an RB, and the number of symbols, symbol length, and cyclic prefix (CP) length in a TTI may be varied in various ways.

The term "connected", "coupled", or any variation thereof, refers to any direct or indirect connection or coupling between two or more elements and may include the presence of one or more intermediate elements between two elements that are "connected" or "coupled" to each other. The coupling or connection between the elements may be physical, logical, or a combination thereof. For example, "connection" may be read as "access". As used in the present disclosure, the two elements may be considered to be "connected" or "coupled" to each other using at least one of one or more electrical wires, cables and printed electrical connections and, as some non-limiting and non-comprehensive examples, electromagnetic energy having wavelengths in the radio frequency region, microwave region and light (both visible and invisible) region.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each apparatus may be replaced with "unit", "circuit", "device", and the like.

Any reference to elements using the designation "first," "second," etc., as used in this disclosure does not generally limit the amount or order of those elements. Such designations can be used in the present disclosure as a convenient way to distinguish between two or more elements. Thus, references to the first and second elements do not imply that only two elements may be employed therein, or that the first element must in some way precede the second element.

In the present disclosure, the used terms "include", "including", and variants thereof are intended to be inclusive in a manner similar to the term "comprising". Furthermore, the term "or" as used in this disclosure is not intended to be an exclusive OR.

Throughout this disclosure, for example, during translation, if articles such as a, an, and the in English are added, in this disclosure, these articles shall include plurality of nouns following these articles.

As used in this disclosure, the terms "determining" and "determining" may encompass a wide variety of actions. "Judgment" and "decision" includes judging or deciding by, for example, judging, calculating, computing, processing, deriving, investigating, looking up, search, inquiry (e.g., searching in a table, database, or other data structure), ascertaining, and the like. In addition, "judgment" and "decision" can include judging or deciding by receiving (for example, receiving information), transmitting (for example, transmitting information), input (input), output (output), and access (accessing) (e.g., accessing data in a memory). In addition, "judgement" and "decision" can include judging or deciding by resolving, selecting, choosing, establishing, and comparing. That is, "judgment" or"decision" may include regarding some action as "judgment" or"decision". Moreover, "judgment (decision)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

EXPLANATION OF REFERENCE NUMERALS

10 Radio communication system
20 NG-RAN
100 gNB
200 UE
210 Radio signal transmission/reception unit
220 Amplifier unit
230 Modulation/demodulation unit
240 Control signal/reference signal processing unit
250 Encoding/decoding unit
260 Data transmission/reception unit
270 Control unit
1001 Processor
1002 Memory
1003 Storage
1004 Communication device
1005 Input device
1006 Output device
1007 Bus

The invention claimed is:

1. A terminal comprising:
a processor that multiplexes first uplink control information having a first priority and second uplink control information having a second priority lower than the first priority on an uplink control channel; and
a transmitter that transmits the first uplink control information and the second uplink control information using the uplink control channel, wherein
the processor determines that a number of resource blocks, in a frequency domain, related to the uplink control channel is a minimum number of resource blocks, so that a condition is satisfied, and
the condition is defined based on a number of bits of the first uplink control information, a number of bits of the second uplink control information, a code rate of the first uplink control information, and a code rate of the second uplink control information.

2. The terminal according to claim 1, wherein
the processor determines that a number of resource blocks related to the uplink control channel is the minimum number of resource blocks, so that the condition is satisfied when format of the uplink control channel is at least one of an uplink control channel format 2 or an uplink control channel format 3.

3. The terminal according to claim 1, wherein
the condition is defined based on a number of error detection bits of the first uplink control information, and a number of error detection bits of the second uplink control information.

4. A radio communication system, comprising:
a terminal and a base station, wherein
the terminal comprises a processor that multiplexes first uplink control information having a first priority and second uplink control information having a second priority lower than the first priority on an uplink control channel;
the base station comprises a receiver that receives the first uplink control information and the second uplink control information using the uplink control channel;
the processor determines that a number of resource blocks, in a frequency domain, related to the uplink control channel is a minimum number of resource blocks, so that a condition is satisfied; and
the condition is defined based on a number of bits of the first uplink control information, a number of bits of the second uplink control information, a code rate of the first uplink control information, and a code rate of the second uplink control information.

5. A radio communication method, comprising:
multiplexing first uplink control information having a first priority and second uplink control information having a second priority lower than the first priority on an uplink control channel;
transmitting the first uplink control information and the second uplink control information using the uplink control channel; and
determining that a number of resource blocks, in a frequency domain, related to the uplink control channel is a minimum number of resource blocks, so that a condition is satisfied, wherein
the condition is defined based on a number of bits of the first uplink control information, a number of bits of the second uplink control information, a code rate of the first uplink control information, and a code rate of the second uplink control information.

* * * * *